June 9, 1959 W. A. KIVELL 2,889,929
COMBINED ANAEROBIC TREATMENT AND CLARIFICATION UNIT
Filed Sept. 3, 1954 2 Sheets-Sheet 1

FIG. I

INVENTOR.
WAYNE A. KIVELL
BY William Fox,
attorney

June 9, 1959   W. A. KIVELL   2,889,929
COMBINED ANAEROBIC TREATMENT AND CLARIFICATION UNIT
Filed Sept. 3, 1954   2 Sheets-Sheet 2

INVENTOR.
WAYNE A. KIVELL
BY William J. Fox,
attorney

United States Patent Office 2,889,929
Patented June 9, 1959

2,889,929

COMBINED ANAEROBIC TREATMENT AND CLARIFICATION UNIT

Wayne A. Kivell, Bronxville, N.Y., assignor to Dorr-Oliver Incorporated, a corporation of Delaware Application September 3, 1954, Serial No. 453,989

2 Claims. (Cl. 210—194)

This invention relates to an apparatus and method for the treatment of organically polluted liquid wastes such as sanitary sewage, industrial wastes, and more particularly to a multi-compartment apparatus therefor.

The primary purpose of treating organically polluted liquids, whether such liquids be in the nature of sanitary sewage or industrial wastes, is to eliminate or minimize the nuisances and health hazards attendant to their discharge into bodies of water. Among the harmful effects arising from the discharge of untreated or insufficiently treated polluted liquids are the presence of solids, the generation of putrefactive odors, and the destruction of fish and other aquatic life in the receiving waters. In the large majority of cases, these effects are caused not only by properties of the polluting constituents themselves, but also by their bacterial decomposition, and the consequent depletion of the dissolved oxygen content of the receiving waters. The problem consequently resolves itself into providing means whereby the polluting constituents of waste flow are separated from the liquid and/or are stabilized under controlled conditions.

Treatment processes have been developed whereby the polluting constituents contained in waste flows may be so separated and stabilized. Broadly speaking, these processes may be classified according to the dissolved oxygen content of the liquid undergoing treatment. Those processes carried out in the presence of dissolved oxygen are referred to as being aerobic, while those in which dissolved oxygen is not present are referred to as being anaerobic.

The apparatus utilized in these processes may be classified into two main groups. The first can be regarded as consisting of those which act solely as mechanical or physical separating means to remove solid polluting materials from the liquid and include devices such as bar racks, screens, and gravity settling clarifiers. The second group includes those devices which exert not only a physical function, but also a bio-chemical one. This group may be exemplified by installations such as trickling filters, activated sludge aeration contact tanks, and digesters. Generally speaking, the devices of the first group may be used alone to accomplish so-called "primary" treatment, or they can be used in conjunction with one or more devices of the second group to accomplish "complete" treatment.

In a typical installation for the treatment or organically polluted liquids, common practice has been to remove readily settleable solids in a clarification station where quiescent conditions are maintained and wherein readily settling solids are permitted to deposit as a sludge on the bottom of the station. Clarified liquid from which a portion of the solids have thus been separated may, under certain circumstances, thereupon be disposed of, or they may be subjected to additional treatment whereby dissolved, colloidal and fine suspended solid material is removed. Sludges formed in the initial or primary clarifier, together with sludges derived from succeeding steps, if any, are generally removed to a digester station, where, under anaerobic conditions, they are subjected to bacterial decomposition. The solids are liquified or gasified, subsequent disposal is facilitated, and valuable gas is produced.

In order to provide compactness and economy of construction it has, for many years, been the practice to provide for clarification by settling and for anaerobic sludge digestion in a single combined unit, such as for example, the well known Imhoff tank, or the apparatus disclosed in Patent No. 1,925,679 issued September 5, 1933 to John F. Skinner. Units of this type comprise two horizontally disposed chambers in vertical juxtaposition and in hydraulic communication with each other; the upper chamber serving as a settling or clarifying station through which liquid is passed directly from the influent means of the combined unit to the effluent means thereof, while the lower chamber served to anaerobically decompose solids removed by gravity from the polluted liquid in the course of passage of the said liquid through the upper compartment.

This invention has, as its principal object an improvement in the dual clarifying and anaerobic decomposition apparatus hereinabove described, and in the method of operating the same, whereby its operating efficiency, insofar as the degree of purification effected is concerned, is materially raised. More particularly this invention achieves the stated object partially through an operational inversion of the unit; that is, by introducing the flow of polluted liquid into the lower or anaerobic treatment compartment, passing a corresponding quantity of supernatant liquid from the digestion compartment to the upper or clarifying compartment, overflowing and discharging clarified liquid from the upper compartment, while allowing solids settled therein to pass back into the lower compartment, and discharging digested sludge from the lower compartment.

Another object of this invention is to permit the use of smaller and consequently more economical equipment to achieve the same qualitative results as are provided by present treating equipment, or, conversely, to provide for greatly increasing capacity if present equipment size is maintained.

In the aerobic bacterial treatment of organically polluted liquids, the organisms comprising the zoogleal matter are sensitive to the environmental pH. Both excessively low and excessively high pH's have a detrimental effect on the bio-chemical process bringing about the desired purification. With regard to high pH values, it has been found that serious complications are likely to be encountered at values above approximately 8.0 while at values above approximately 8.8 the causticity present will not only inhibit, but actually destroy the aerobic organisms. The clarified effluents of installations and processes of the class into which the subject matter of this invention falls, are frequently subjected to further treatment of an aerobic biological nature, and it becomes imperative in those cases, that the said effluents applied to such aerobic treating means have a pH below the values stated above. As indicated in the operative examples hereinafter presented, this invention, by reason of the acidifying reactions occurring in the anaerobic treatment compartment, provides a strong pH reducing effect on sewage which enters the unit with an excessively high pH. Consequently, it is another object of this invention to provide for a reduction in the pH of raw sewage which enters the system at values above those at which satisfactory aerobic biological treatment can be conducted.

Greases and other fatty materials present in raw waste liquids pose one of the severest problems in the treatment of such flows. Their harmful effects are felt particularly where secondary or aerobic treatment is carried out by passing the polluted liquid through porous beds of discrete particles bearing the purifying zoogleal matter, as is the case with sand and trickling filters. In those instances the greases tend to fill in the interstices between the discrete particles, and thus clog the bed. The problem is compounded when emulsifying agents such as detergents are also present in the waste flow. Greases which are introduced to treatment in emulsified form tend to resist settling and reach the filter beds in essentially undiminished quantity.

Heretofore, grease removal means have, to a large extent, been limited to complex and relatively costly flotation and skimming devices. It is well known, however, that grease emulsions of the nature generally encountered in polluted liquids can be "broken" by a number of different methods, among them physical contact with solids. It has, in addition, been found that the higher the temperature the more readily the breaking occurs. A treatment installation incorporating the teachings of this invention will achieve a high degree of removal of grease present in the raw influence, whether or not such grease is emulsified, by reason of the fact that, as the first step in the process, the raw flow is brought into contact with solids present in the anaerobic treatment compartment, said solids tending not only to remove grease by ordinary entrainment, but also to rupture the globules of the grease emulsion and to release the grease itself for rapid anaerobic decomposition by the bacterial organisms present. These emulsion breaking characteristics are heightened by the fact that due to heat added from external sources and by the exothermic bacterial processes taking place within the anaerobic treatment compartment, the temperature in the said compartment is generally maintained at a materially higher level than those prevailing in the rest of the system. It consequently becomes still another object of this invention to provide for the effective elimination of grease, and particularly emulsified grease as a source of difficulty in the treatment of polluted liquids.

The physical biological and chemical basis for the improved functional characteristics indicated above can be ascribed to a combination of factors which include one or more of the following. By reason of the introduction of the polluted liquid into the digestion chamber, the organic matters constituting the polluting constituents are brought into intimate contact with active biologic organisms capable of causing their breakdown into inert, non-objectionable compounds. In addition, the actual physical contacting of all or a portion of the digester solids with incoming suspended solids causes entrainment and adsorption of the polluting materials and thus plays a role in the clarification and purification of the waste flow in a manner analogous to that encountered in activated sludge treatment.

As this invention may be embodied in several forms without departing from the spirit or essential characteristics thereof, the present embodiment is therefore illustrative and not restrictive since the scope of the invention is defined by the appended claims rather than by the description preceding them, and all changes that fall within the metes and bounds of the claims, or of forms that are their functional as well as conjointly cooperative equivalents are therefore intended to be embraced by those claims.

Figure 1:
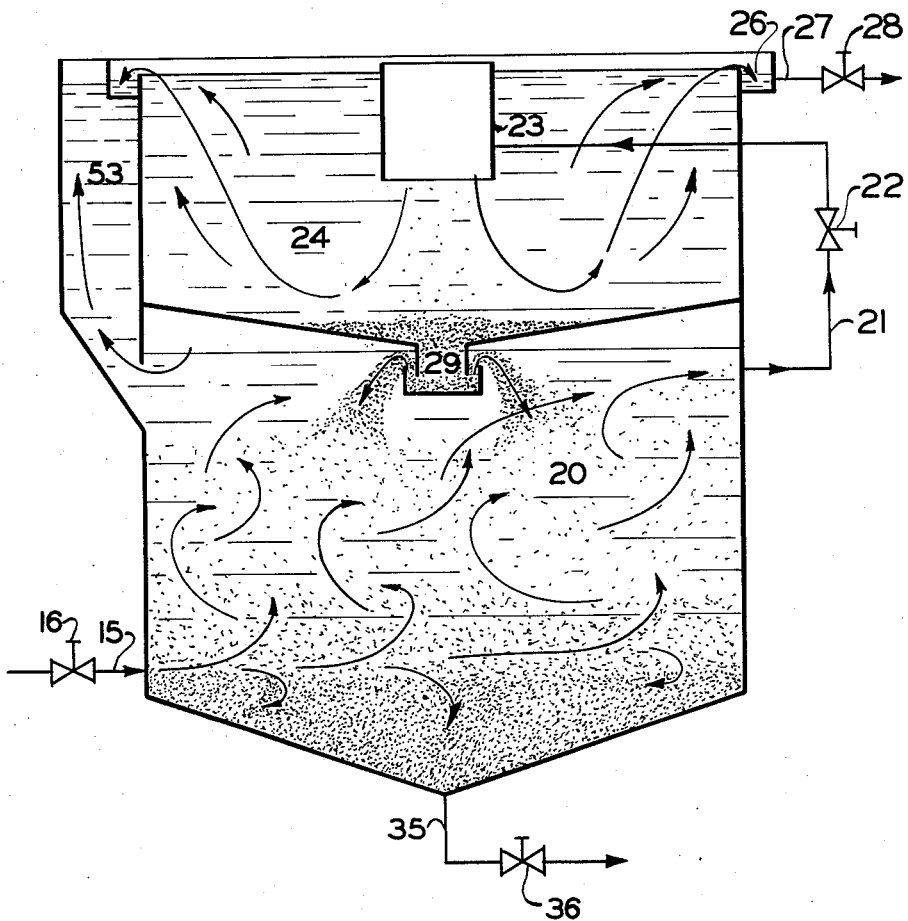
Figure 1 is a schematic drawing illustrating the basic flow pattern of this invention.

Figure 1 shows the flow pattern utilized in this invention. Polluted liquid enters lower anaerobic treatment compartment 20 by suitable conduit means such as that represented by pipe 15 and valve 16. In the said anaerobic compartment 20, biochemically active solids act upon the polluted liquid to remove therefrom its polluting constituents and subject the said polluting constituents to anaerobic decomposition.

Upon the introduction of additional polluted liquid to the said lower compartment 20 treated liquid passes from the said compartment 20 by way of hydraulic communicating pipe 21 and valve 22, into central feed well 23 and thence into upper or clarifying compartment 24. Under quiescent conditions partially or wholly decomposed solids suspended in the influent to the said upper compartment 24 are permitted to settle. Clarified effluent overflows into peripheral launder 26 and is discharged by means of pipe 27, here shown fitted with valve 28.

Figure 2:
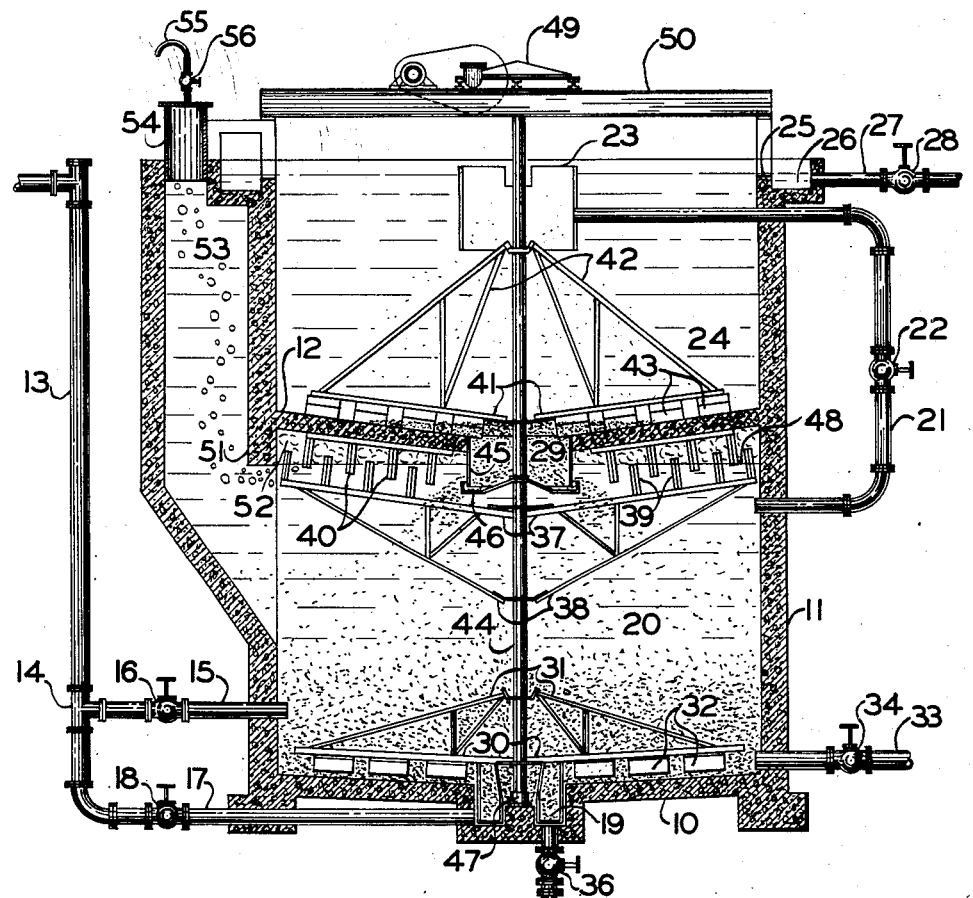
Figure 2 is a vertical cross-sectional view of one embodiment of this invention.

Solids removed by gravity in the course of the clarification process, are collected by suitable scraper means as illustrated in Figure 2, into sump 29 whence they return by gravity to lower compartment 20, and re-enter the continuing anaerobic treatment process taking place therein. While the solids in the anaerobic compartment 20 are accumulated and retained therein for relatively long periods as compared to the retention period for raw polluted liquid entering the system, fully digested matter or sludge must be removed periodically in order to prevent excessive solids density in the said lower compartment 20. For this reason, sludge withdrawal means, such as those represented by pipe 35 and valve 36 must be provided whereby excess digested solids are completely removed from the system.

The digestive processes which constitute part of the purification function of lower or anaerobic treatment compartment 20 results in the formation of several different products, among them certain gases. These gases rise through the liquid contents of compartment 20 and find their way into gas chamber 53, wherein they continue to rise to the surface thereof and are ultimately discharged to waste or to use by suitable gas disposal means.

Figure 2 illustrates an embodiment of this invention comprising a tank with bottom 10, peripheral wall 11, and generally horizontal partition wall 12; said partition wall having a slight slope in a downward direction from the said peripheral wall towards the central vertical axis of the unit, and serving to divide the tank into two functionally separate but hydraulically communicating compartments, namely an upper or clarification compartment 24 and a lower compartment 20 for treatment of liquid waste or sewage under anaerobic conditions. The said liquid wastes or sewage enter by means of a main supply pipe 13 leading to juncture 14 whence branch pipe 15 and 17 emanate. Branch pipe 15 with control valve 16 serves as a raw feed line to the lower compartment 20 of the treatment unit, while branch pipe 17 with control valve 18 serves as an alternate raw feed line leading to central well 19 which opens into the bottom of lower compartment 20. Liquid wastes or sewage, having undergone treatment under anaerobic conditions, pass from anaerobic compartment 20 by way of communicating transfer pipe 21 and control valve 22 into central top feed well 23 and then downwardly into clarifying compartment 24. Following retention and clarification in the said compartment 24, clarified effluent overflows weir 25 into launder 26 and is transmitted thereby to discharge pipe 27, here shown to have a control valve 28.

Gas chamber 53, in direct hydraulic communication with anaerobic treatment compartment 20, extends upward to an elevation substantially corresponding to that of the top of the outer wall of peripheral launder 26 and has a common wall with both a portion of clarifying compartment 24 and a portion of the said peripheral launder 26. The portion of the inner wall of gas chamber 53 common also to clarifying compartment 24, is preferably extended downwardly to an elevation below that of the adjacent portion of partition 12 to form a lip 51 acting to trap gas rising from the said anaerobic treatment compartment and thus to form a gas pocket 52 between the anaerobic treatment and clarifying compartments which serves to provide thermal insulation between the said two compartments. It is also desirable that gas chamber 53 be provided with a gas dome 54 as shown, said dome being fitted with a discharge pipe 55 and control valve 56.

The lower or anaerobic treatment compartment 20 is equipped with a rotating scraper assembly consisting of scraper arms 30 with supporting truss 31, and scraper blades 32 extending in a downward direction from the said arms 30. The entire lower compartment scraper assembly is actuated by torque supplied by the central drive shaft 44, said shaft being rotatably supported by structural member 50 and steady bearing 47, and receiving its motive power from any appropriate means such as drive 49.

The lower or anaerobic treatment compartment 20 is also equipped with a rotating scum breaker assembly consisting of breaker arms 37 with supporting truss 38 and upwardly extending blades 39. In order to break up scum tending to form at the top of the digester compartment more effectively, generally downwardly extending blades 40 are fixedly mounted on the bottom of dividing partition 12, and positioned in such manner that the blades 39 will, in the course of their rotational movement, pass through the fixed spaces between the blades 40 and the spaces between the said fixed blades and the peripheral wall 11. As was the case with the scraper assembly hereinabove described, the scum breaker assembly derives its actuating torque from central drive shaft 44.

In addition, the anaerobic treatment compartment is preferably furnished with two raw waste liquid inlet means, pipes 15 and 17, and two sludge withdrawal means, pipe 33 with control valve 34 and pipe 35 with control valve 36. When raw waste liquid is introduced by means of pipe 15, sludge is withdrawn by means of pipe 35. When raw waste liquid enters by pipe 17, sludge is drawn off through pipe 33.

The upper or clarifying compartment 24 is equipped with a scraper assembly consisting of scraper arms 41 with supporting truss 42 and blades 43 extending in a downward direction from the said arms 41. As was the case with the scraper and scum breaker assemblies of the lower compartment, the upper compartment scraper assembly derives its actuating torque from the central drive shaft 44 to which it is affixed. Sludge collected by the scraper assembly is drawn toward the central axis of the unit and discharged into a sump 29, comprising a boot 45 and a closure plate 46, and passes thence, by gravity, through a clearance space provided between adjacent portions of the said boot and the said closure plate, into the lower compartment.

The polluting constituents of waste flow entering anaerobic treatment compartment 20 by means of pipe 15, or pipe 17 and well 19, are brought into intimate, sustained contact with digesting sludge, and with the bacterial organisms associated therewith. The entrainment, adsorption and direct bio-chemical decomposition which ensues results in a removal of organic polluting constituents from the liquid, and their ultimate breakdown into solid material, referred to as humus, gases composed principally of methane and carbon dioxide, and various liquid products in relatively small quantities. The humus or digested sludge solids resulting from this process accumulates in anaerobic treatment compartment 20, and is removed either periodically or continuously. In order to facilitate bio-chemical activity, it is further desirable to supplement the hydraulic mixing action of the incoming polluted liquid by mechanical stirring means. Both of these effects are achieved in the apparatus embodiment shown in Figure 1 by the scraper assembly comprising scraper arms 30, supporting truss 31 and downwardly extending scraper blades 32. This assembly fixed to and rotationally actuated by vertical central drive shaft 44 serves to stir the entire lower compartment contents, and to circulate bottom sludge by continuously moving it in a generally radial direction toward the central vertical axis of the unit. When discharge pipe 35 with associated control valve 36 is being utilized for sludge draw-off, the material transported by the said lower compartment scraper assembly enters sump well 19 and is drawn thence into pipe 35. When it is found advantageous to withdraw digested materials by means of pipe 33 with associated valve 34, the said scraper assembly serves to equalize the distribution of the sludge solids within the compartment and thus provide for a uniformly dense draw-off.

During the course of anaerobic bacterial decomposition of organic matter, gases composed primarily of methane and carbon dioxide will be produced. These gases tend to rise through the decomposing or digesting mass and will generally carry with them, to the surface of the said mass, small solid particles of organic matter. The matter thus floated, tends to form a dense, tenacious scum at the surface of the digester unit, which scum, if left undisturbed, will resist bacterial decomposition. Consequently, in the embodiment illustrated in Figure 2, a rotatably mounted scum breaker assembly comprising arms 37, supporting truss 38 and generally upwardly extending blades 39, is provided to break up surface scum, and cause it to sink once more into the liquid mass comprising the lower compartment contents, and thus be subjected again to the decomposing activities of the anaerobic bacterial organisms contained therein. In the apparatus shown, generally upwardly extending blades 39 of the rotating scum breaker assembly are mounted on the scum breaker arm in cooperative relationship to fixed generally downwardly extending blades 40 attached to the underside of compartment separating partition 12, in order to provide greater breaking efficiency by reason of the shear forces set up in the scum as the rotating blades 39 approach and pass through the spaces between the fixed blades 40.

Gases freed from the scum and from the liquid contents of the lower compartment are blocked from further vertical movement by compartment separating partition 12 and closure plate 46, and will accumulate in pocket 52 defined by said partition 12, boot 45, peripheral wall 11, lip 51, and the liquid surface 48 of the lower compartment contents, until a sufficient quantity is present to force additional gas being generated to pass beneath lip 51 and into gas chamber 53. Gas pocket 52, formed in the described manner, acts as a thermal barrier whereby heat losses from the lower anaerobic treatment compartment 20 to upper clarifying compartment 24 are minimized. This heat retaining characteristic is a desirable feature inasmuch as the rate of bacterial activity in the lower compartment 20 is materially reduced by a lowering of the environmental temperature at which the biochemical reactions proceed.

Gas chamber 53 serves primarily as a gas disposal means whereby gases generated in anaerobic treatment compartment 20 are transmitted to waste or to utilization without the necessity of allowing gas bubbles to pass up through upper or clarifying compartment 24, and thereby avoiding any disturbance of the quiescent conditions which must be maintained therein. In order to provide for the controlled discharge of gas from the unit, it is desirable that gas chamber 53 be provided with a tight gas dome 54 fitted with suitable flow rate control means such as pipe 55 and associated control valve 56.

The contents of anaerobic treatment compartment 20 will, under normal operating conditions, be subject to some degree of segregation whereby the density of suspended solids will be greater in or near the bottom regions than in the upper ones. Consequently, the inlet to the transfer means for anaerobically treated liquid, namely pipe 21 with control valve 22, is located, as shown in the embodiment represented by Figure 2, in the upper portion of the anaerobic treatment compartment 20, but below the level of any floating scum likely to be present therein. Raw polluted liquid entering the compartment 20 causes a physical displacement of the contents of the said compartment, and a concurrent transfer of a portion of the contents thereof to and through the said transfer means, pipe 21 and valve 22. The liquid thus transferred is discharged into feed well 23 and passed downwardly therein to diffusion within the contents of clarifying compartment 24.

It is the function of clarifying compartment 24 to provide for the gravity settling and removal, from the liquid being treated of settleable solids carried up from the lower anaerobic treatment compartment 20. Settled solid material which forms a sludge deposit on the bottom of compartment 24 consists in large part of organic matter in a state of partial anaerobic decomposition. Since the presence of any significant quantity of gas bubbles reresulting from continuing decomposition of these sludges in compartment 24 would exert a deleterious effect on settling, it is imperative that the sludge be expeditiously removed. In order to facilitate such removal, the particular embodiment illustrated in Figure 2 provides a rotatably mounted scraper assembly for compartment 24 comprising scraper arms 41, with supporting truss 42 and downwardly extending scraper blades 43, said blades being so mounted that upon their rotation they act to impel the sludge toward and into sump 29. Sump 29 consists essentially of two components, namely a downcast boot 45 and closure plate 46. The downcast boot 45 is fixedly mounted within a central opening in compartment separating partition 12, and has its upper edge flush with the upper surface of the adjacent portion of partition 12. Closure plate 46, mounted on vertical drive shaft 44 and rotating therewith, is located in cooperative relationship with boot 45 whereby sludge collecting in sump 29 is permitted to pass by gravity through a suitable space left between adjacent portions of said boot 45 and said closure plate 46, and be discharged into anaerobic treatment compartment 20. It should be noted that no liquid or solid material is permitted to enter the sump from lower compartment 20, the downwardly migrating sludge itself forming an effective seal. The structure of upper compartment sump 29 is more fully dealt with hereinbelow in connection with the description of Figure 3.

The settling process in upper compartment 24 occurs while the liquid is in generally radial transit from the central feed well 23 to the peripheral overflow weir 25. Settled liquid, overflowing the said weir 25 enters launder 26 and is transmitted thereby to effluent pipe 27 with associated control valve 28.

As hereinabove indicated, central drive shaft 44 rotatably supported by structural member 50 and steady bearing 47 serves to transmit motive torque from the drive means 49 to the sludge scraping and scum breaking assemblies in lower or anaerobic treatment compartment 20, and to the sludge scraping assembly of upper or clarifying compartment 24. In addition, the said shaft 44 serves to rotate closure plate 46 of the upper compartment sump 29 in order to facilitate the ready passage of sludge contained in the said sump past the said closure plate into the lower compartment 20.

Figure 3:
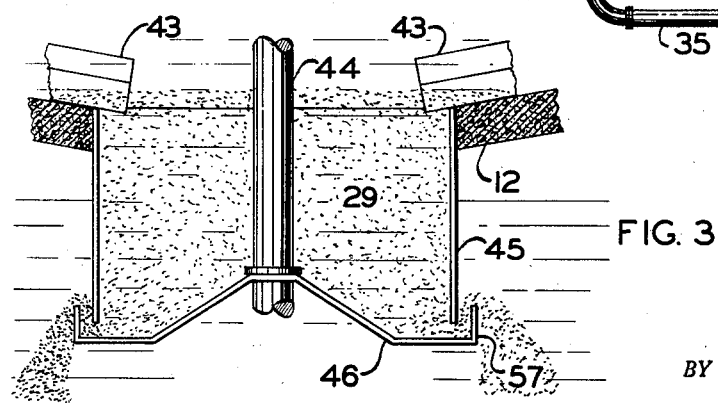
Figure 3 is an enlarged detail showing the means for returning settled solids from the upper or clarifying compartment to the lower or anaerobic treatment compartment of the Figure 1 embodiment.

Figure 3 is an enlarged view of the sludge transfer means utilized in the Figure 1 embodiment to transfer solids deposited in the upper or clarifying compartment 24 to the lower or anaerobic treatment compartment 20. As shown, it consists of boot 45, the upper edge of which is flush with the adjacent upper surface of dividing partition 12, and a closure plate 46 fixed to rotating drive shaft 44.

Scraper blades 43 are part of the upper compartment scraper assembly hereinabove described and serve to discharge solids settling on partition 12 into sump 29 formed by boot 45 and closure plate 46. As the sump fills, pressure is generated whereby the sludge in the lower portion of the sump is forced through the annular opening between the said boot 45 and closure plate 46, and enters anaerobic treatment compartment 20. It should be noted, that rotating closure plate 46 overlaps boot 45 and that, furthermore, the said closure plate is fitted with a peripheral upwardly extending flange 57 whereby gas rising from the anaerobic treatment compartment 20 is completely barred from entering the sump, where it would tend to agitate the sludge contained therein and thus interfere with clarification in settling compartment 24. In addition, the construction shown and described utilizes the relatively dense and compact sludge present in the sump as an effective seal to prevent the passage of liquid from lower anaerobic treatment compartment 20 to upper clarifying compartment 24. It may consequently be said that the sump assembly shown constitutes a one-way passage means whereby solids are allowed to pass from compartment 20 to compartment 24, but nothing can pass in the opposite direction, namely from compartment 24 to compartment 20.

The advantages to be derived from practicing the teachings of this invention may be illustrated by the following experimental data obtained from a dual compartment treatment unit comprising a clarifying compartment and a subjacent hydraulically communicating anaerobic treatment compartment, said dual unit having, by suitable apparatus modifications, been adapted to operate in accordance with the invention as herein set forth. The flow sheet by which the unit was operated called, in brief, for the continuous introduction of raw waste liquid into the lower, or anaerobic treatment compartment and following treatment therein, its passage by way of hydraulic communicating means into the clarifying compartment, whence, after a period of quiescence it was discharged to further treatment on said filters. The waste flow treated was sewage emanating from a roadside service station at which food was served. Samples for the analyses recorded were taken during a consecutive ten day period in the fall of the year.

*Experimental test data*

| Sample No. | pH | | Alkalinity | | BOD | | Fats | | Susp. Solids | | DO | |
|---|---|---|---|---|---|---|---|---|---|---|---|---|
| | Raw | Eff. | Raw | Eff. | Raw | Eff. | Raw | Eff. | Raw | Eff. | Raw | Eff. |
| 1 | 9.4 | 7.2 | 185 | 423 | 255 | 92 | 47.0 | 17.0 | 126 | 71 | 7.2 | 6.8 |
| 2 | 9.0 | 7.3 | 246 | 468 | 769 | 144 | 144.2 | 22.2 | 496 | 83 | 5.8 | 4.6 |
| 3 | 9.7 | 7.5 | 280 | 477 | 664 | 174 | 99.6 | 28.6 | 316 | 97 | 4.6 | 1.7 |
| 4 | 9.8 | 7.5 | 341 | 469 | 499 | 171 | 190.0 | 44.4 | 375 | 59 | 5.8 | 1.4 |
| 5 | 10.0 | 7.5 | 498 | 498 | 668 | 122 | 209.0 | 18.4 | 423 | 72 | 5.1 | 2.7 |
| 6 | 9.3 | 7.3 | 236 | 497 | 499 | 138 | 150.4 | 29.0 | 346 | 67 | 5.5 | 1.7 |
| 7 | 9.0 | 7.2 | 220 | 400 | 89 | 101 | 89.8 | 31.8 | 231 | 73 | 5.9 | 1.8 |
| 8 | 10.0 | 7.4 | 472 | 532 | 600 | 113 | 198.2 | 33.6 | 409 | 101 | 6.4 | 3.3 |
| 9 | 9.5 | 7.3 | 296 | 560 | 389 | 113 | 84.6 | 32.2 | 214 | 90 | 7.0 | 0.6 |
| 10 | 9.2 | 7.4 | 230 | 576 | 436 | 133 | 74.6 | 29.0 | 118 | 174 | 4.8 | 0.0 |
| Average | 9.5 | 7.36 | 300 | 490 | 477 | 131 | 128.7 | 28.7 | 305 | 89 | 5.8 | 2.5 |

(1) The term "Raw" as used in the column headings refers to raw influent to the dual treating unit.
(2) The term "Eff." as used in the column headings refers to treated effluent leaving the dual unit.

It may be seen from the above that, on the average, BOD reduction between raw polluted liquid influent and treated effluent came to approximately 72%, grease or fat reduction to approximately 77%, and suspended solids reduction to approximately 71%. The magnitude of functional efficiency thus demonstrated is evident when one considers the fact that with ordinary clarification and separate sludge digestion the corresponding reductions reasonably to be expected run to approximately 25% to 40% for BOD, 35% to 55% for grease or fat and 60% for suspended solids.

In addition to these analytical benefits, it may be noted that, prior to the modification mentioned above, the installation was not functioning satisfactorily in that the sand filters which followed the unit were subject to clogging. Grease, soap and detergent solids were being carried through to the filters and after two or three weeks of operation the top 1½ to 2 inches of sand were permeated with this material, resulting in a complete sealing of the bed to further passage of settled raw waste. Following the modifications which brought the unit within the requirements of this invention, difficulties with the sand filters due to clogging were completely eliminated. During the entire time of the experimental studies, lasting over a period of four months, there was no evidence of clogging or ponding.

I claim:

1. A combined unit for the anaerobic treatment and the classification of waste liquids including an anaerobic treatment compartment wherein mixing and contacting of polluting constituents of the said raw flow with solids in an active state of bacterial decomposition takes place, means disposed in the lower portion of said compartment for introducing raw waste liquid thereinto, means for removing the solid products of decomposition from the said anaerobic treatment compartment, means for removing the gaseous products of decomposition from the said compartment, means for transporting liquid from which a quantity of polluting constituents have been removed in the said anaerobic treatment compartment directly to a clarifying compartment in superjacent relationship to the anaerobic treatment compartment and having a common generally horizontally disposed dividing partition therewith, said partition constituting the floor of the said clarifying compartment and the ceiling of the said anaerobic treatment compartment, means for withdrawing clarified effluent from the upper portion of the clarifying compartment, said clarified liquid withdrawal means being adapted to withdraw said liquid from a zone functionally remote from the discharge terminus of said means for transporting liquid from the anaerobic compartment to the clarifying compartment, and means for removing settled solids from the clarifying compartment; wherein the said anaerobic treatment compartment contains scum breaking means comprising a rotating assembly fitted with generally upwardly extending blades passing through the uppermost portions of the anaerobic treatment compartment liquid contents, said upwardly extending rotating blades being mounted in cooperative relationship to generally downwardly extending fixed blades projecting from the lower surface of the said generally horizontally disposed dividing partition, whereby the said rotating blades pass through the spaces between the said fixed blades and the spaces between the outermost of the said fixed blades and the peripheral wall of the unit, and by reason whereof shear forces are generated which act to break up scum which forms at the liquid surface within the anaerobic treatment compartment, and to subject said scum to further decomposition.

2. A combined unit for the anaerobic treatment and clarification of waste liquids including an anaerobic treatment compartment wherein mixing and contacting of polluting constituents of the said raw flow with solids in an active state of bacterial decomposition takes place, means for introducing raw waste liquid into the said compartment, means for removing the solid products of decomposition from the said anaerobic treatment compartment, means for removing the gaseous products of decomposition from the said compartment, means for transporting liquid from which a quantity of polluting constituents have been removed in the said anaerobic treatment compartment to a clarification compartment in superjacent relationship to the anaerobic treatment compartment and having a common, generally horizontally disposed dividing partition therewith, said partition constituting the floor of the said clarifying compartment and the ceiling of the said anaerobic treatment compartment, means for withdrawing clarified effluent from the upper portion of the clarifying compartment, said clarified liquid withdrawal means being adapted to withdraw said liquid from a zone functionally remote from the discharge terminus of said means for transporting liquid from the anaerobic compartment to the clarifying compartment, and means for removing settled solids from the clarifying compartment; further characterized by a unitary mechanical apparatus comprising a driving means with an associated rotatably mounted drive shaft, said drive shaft passing vertically through the central axes of both the clarifying compartment and the anaerobic treatment compartment, and being connected to, and supplying motive torque for rotating scraper and scum breaking assemblies present in the anaerobic treatment compartment, a rotating scraper assembly present in the clarifying compartment, and for a rotating closure plate which constitutes one component part of the clarifier compartment sludge removal means whereby sludge is transported by gravity from the said clarifying compartment to the said subjacent anaerobic treatment compartment.

References Cited in the file of this patent

UNITED STATES PATENTS

| | | |
|---|---|---|
| 1,392,214 | Peck | Sept. 27, 1921 |
| 1,925,679 | Skinner | Sept. 5, 1933 |
| 2,553,228 | Yonner | May 15, 1951 |